(12) United States Patent
Kanda

(10) Patent No.: US 9,070,189 B2
(45) Date of Patent: Jun. 30, 2015

(54) IMAGE BLURRING CORRECTION DEVICE

(71) Applicant: Panasonic Corporation, Osaka (JP)

(72) Inventor: Yoshihiro Kanda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/177,651

(22) Filed: Feb. 11, 2014

(65) Prior Publication Data

US 2014/0161368 A1 Jun. 12, 2014

Related U.S. Application Data

(63) Continuation of application No. PCT/JP2012/007186, filed on Nov. 8, 2012.

(30) Foreign Application Priority Data

Nov. 10, 2011 (JP) .................................. 2011-246586

(51) Int. Cl.
*G06K 9/40* (2006.01)
*G06T 5/00* (2006.01)
*H04N 5/225* (2006.01)
*H04N 5/232* (2006.01)
*G03B 5/00* (2006.01)

(52) U.S. Cl.
CPC . *G06T 5/003* (2013.01); *G03B 5/00* (2013.01); *H04N 5/2254* (2013.01); *H04N 5/23264* (2013.01); *G06T 2207/20201* (2013.01)

(58) Field of Classification Search
USPC ........................................ 382/255, 264, 275
See application file for complete search history.

(56) References Cited

U.S. PATENT DOCUMENTS

| | | | |
|---|---|---|---|
| 7,580,620 B2 | 8/2009 | Raskar et al. | |
| 7,756,407 B2 | 7/2010 | Raskar | |
| 7,888,626 B2 | 2/2011 | Slinger et al. | |
| 8,103,112 B2 | 1/2012 | Horie et al. | |

(Continued)

FOREIGN PATENT DOCUMENTS

| | | | |
|---|---|---|---|
| JP | 2541924 B2 | 10/1996 | |
| JP | 2008-005084 A | 1/2008 | |

(Continued)

OTHER PUBLICATIONS

International Search Report for corresponding International Application No. PCT/JP2012/007186 mailed Feb. 5, 2013.

*Primary Examiner* — Phuoc Tran
(74) *Attorney, Agent, or Firm* — Renner, Otto, Boisselle & Sklar, LLP

(57) ABSTRACT

The present image blurring correction device includes light field information generating portion, angle blurring amount detecting portion and correcting portion. The light field information generating portion generates a series of light field information corresponding to consecutive shooting images shot by a digital camera. The angle blurring amount detecting portion detects a blurring amount of the digital camera based on variation in the series of light field information. The correcting portion corrects the series of light field information in accordance with the blurring amount so as to suppress variation in the series of light field information.

4 Claims, 8 Drawing Sheets

(56) References Cited

U.S. PATENT DOCUMENTS

| | | |
|---|---|---|
| 2007/0258706 A1* | 11/2007 | Raskar et al. .................. 396/52 |
| 2007/0258707 A1 | 11/2007 | Raskar |
| 2007/0297694 A1 | 12/2007 | Kurata |
| 2008/0193026 A1 | 8/2008 | Horie et al. |
| 2009/0095912 A1 | 4/2009 | Slinger et al. |
| 2013/0077882 A1* | 3/2013 | Venkataraman et al. ..... 382/233 |
| 2013/0128087 A1* | 5/2013 | Georgiev et al. ............. 348/307 |

FOREIGN PATENT DOCUMENTS

| | | |
|---|---|---|
| JP | 2008-219878 A | 9/2008 |
| JP | 2008-542863 A | 11/2008 |
| JP | 2008-310797 A | 12/2008 |
| JP | 2009-522825 A | 6/2009 |
| JP | 2009-532928 A | 9/2009 |
| JP | 2010-273032 A | 12/2010 |
| JP | 2011-048544 A | 3/2011 |

* cited by examiner

IMAGE BLURRING CORRECTION DEVICE

CROSS-REFERENCE TO RELATED APPLICATIONS

This is a continuation application of International Application PCT/JP2012/007186, with an international filing date of Nov. 8, 2012 which claims priority to Japanese Patent Application No. 2011-246586 filed on Nov. 10, 2011. The entire disclosures of International Application PCT/JP2012/007186 and Japanese Patent Application No. 2011-246586 are hereby incorporated herein by reference.

BACKGROUND

1. Technical Field

The technology disclosed herein relates to an image blurring correction device.

2. Background Information

A type of well-known imaging device is equipped with an image blurring correction mechanism (see Publication of Japan Patent No. 2541924). In this type of imaging device, when a light ray of an image is inputted into an imaging sensor through an imaging optical system, a detection portion is configured to detect displacement of the image on the imaging sensor. The imaging optical system is then moved by a drive actuator based on the detected displacement. Accordingly, the position of the image on the imaging sensor is corrected. Such a well-known imaging device is configured to output a less blurred image by the image blurring correction mechanism as described above.

When image blurring is caused in the well-known imaging device, the well-known imaging device has been configured to correct the image blurring by the image blurring correction mechanism as described above. For example, when the imaging device is rotated in the pitch direction and the yaw direction or when the imaging device is moved in the up-and-down direction and the right-and-left direction, the imaging optical system has been configured to be moved for correcting the image blurring.

However, when the imaging device is moved in the up-and-down direction and the right-and-left direction in a situation that a plurality of objects exist in the depth direction, chances are that image blurring cannot be accurately corrected depending on what the situation is actually like. For example, explanation will be herein made for a situation that an object (a first object) located closer to the imaging device and another object (a second object) located away from the imaging device are disposed on the same axis. When the imaging device is moved upward in the situation, displacement (first displacement) of a first object image on the imaging sensor and displacement (second displacement) of a second object image on the imaging sensor are different from each other.

Thus, when image blurring is corrected based on the first displacement, an error is caused in blurring correction of the second object image. Contrarily, when image blurring is corrected based on the second displacement, an error is caused in blurring correction of the first object image. Thus, the well-known image blurring correction mechanism has had a drawback that, when a plurality of objects exist in the depth direction, blurring cannot be corrected for the respective objects (the first object and the second object). It should be noted that explanation has been herein made for an example that the imaging device is moved upward. However, such a drawback is similarly caused even when the imaging device is moved downward or in the right-and-left direction.

The technology herein disclosed has been produced in view of the aforementioned drawback. It is an object of the present technology to provide an image blurring correction device that is capable of successfully correcting image blurring even when a plurality of objects exist in different positions in the depth direction.

SUMMARY

An image blurring correction device disclosed herein includes light field information generating portion, blurring amount detecting portion and correcting portion. The light field information generating portion generates a series of light field information corresponding to consecutive shot images shot by an imaging device. The blurring amount detecting portion detects a blurring amount of the imaging device based on variation in the series of light field information. The correcting portion corrects the series of light field information in accordance with the detected blurring amount so as to suppress variation in the series of light field information.

With the configuration of the image blurring correction device as described above, image blurring can be successfully corrected even when a plurality of objects exist in different positions in the depth direction.

BRIEF DESCRIPTION OF THE DRAWINGS

Referring now to the attached drawings which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

EMBODIMENT

1. Exemplary Embodiment

With reference to the attached drawings, explanation will be hereinafter made for an exemplary embodiment where the present technology is applied to a digital camera.

<1-1. Schematic Explanation of Entire Digital Camera>

Figure 1:
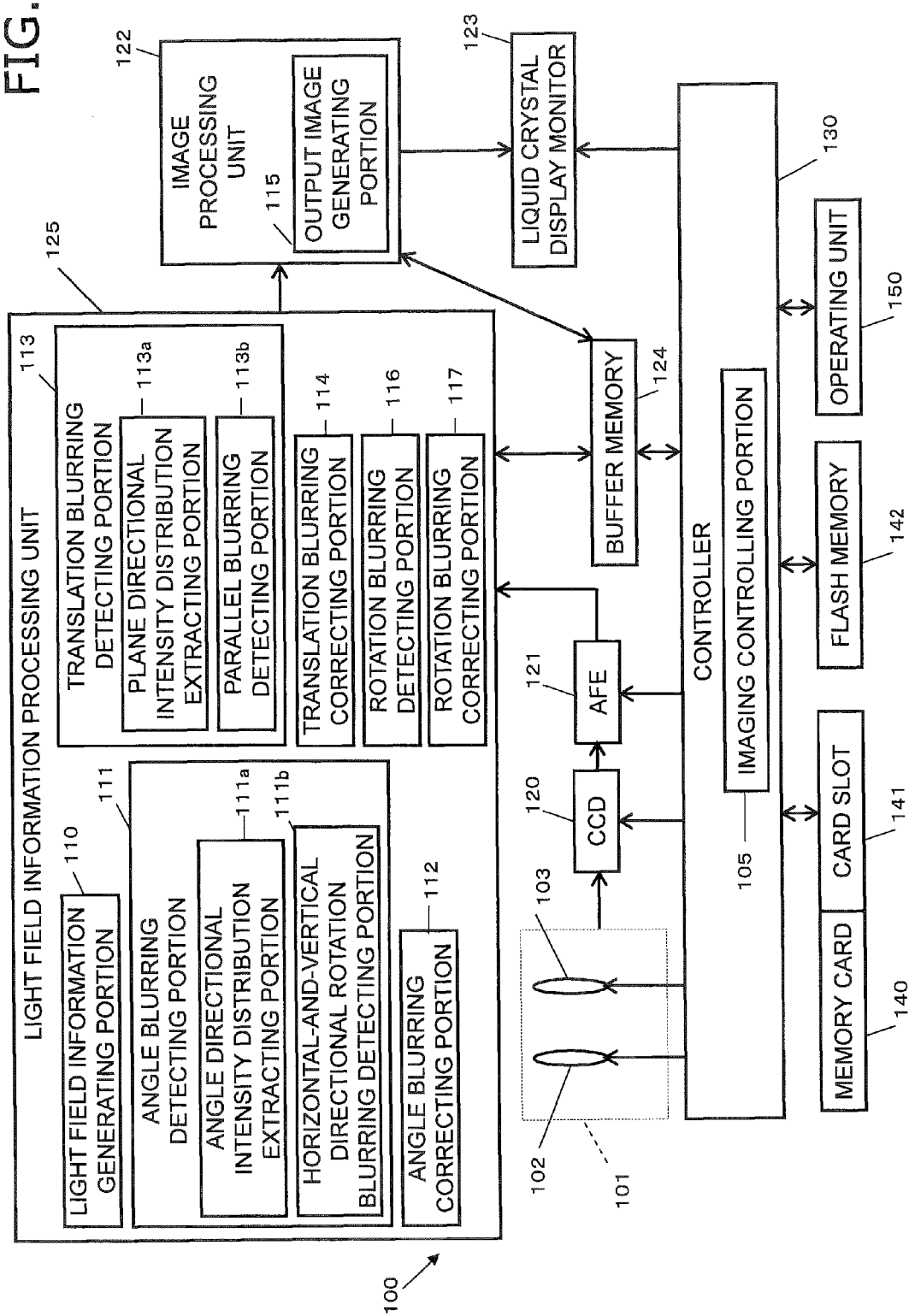
FIG. 1 is a block diagram of a light field camera according to the present exemplary embodiment.

As shown in FIG. 1, a digital camera 100 includes an optical system 101, an imaging sensor 120, an AFE (Analog Front End) 121, a light field information processing unit 125, an image processing unit 122, a buffer memory 124 and a liquid crystal display monitor 123. Moreover, the digital camera 100 further includes a controller 130, a card slot 141, a flash memory 142 and an operating unit 150.

The optical system 101 forms an object image. The optical system 101 is mainly composed of a plurality of lenses 102 (including a focus lens) and a lens array 103. The lenses 102 are of a type in use for adjusting a focused state of an object and a view angle of an object. The lenses 102 may be composed of a plurality of lenses, or alternatively, may be composed of a plurality of groups of lenses. It should be noted that the configuration that the optical system 101 includes the lenses 102 has been herein exemplified. However, it is not necessarily required to prepare the lenses 102 as long as the lens array 103 is provided.

Figure 2:
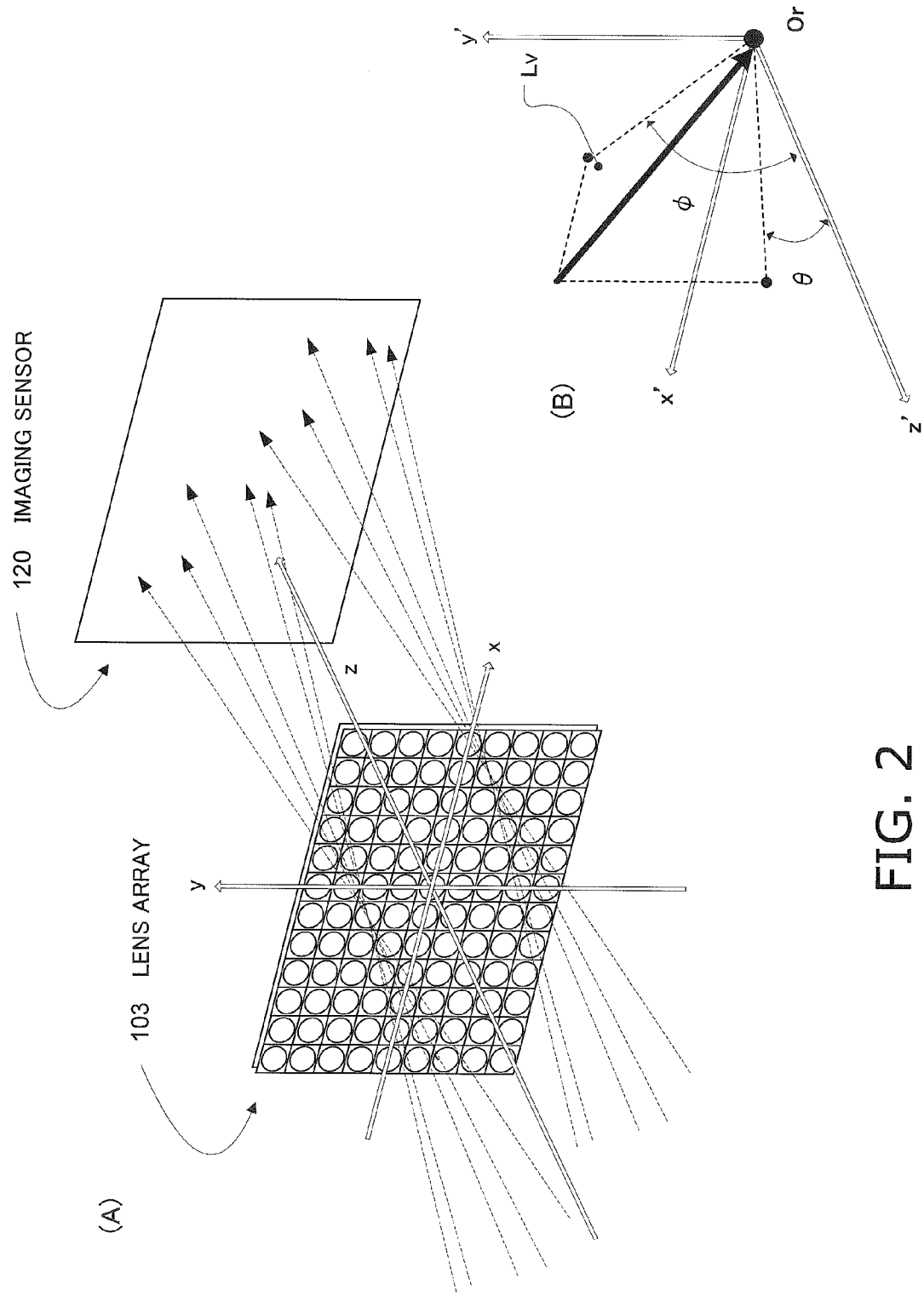
FIG. 2 includes a diagram (A) for showing a relation between an imaging device and light rays passing through a lens array and a diagram (B) for explaining a light ray incident angle ($\theta$, $\phi$) in the light field camera according to the present exemplary embodiment.

The lens array 103 is a type of lens that a plurality of lens elements are aligned in a matrix manner (see FIG. 2). The lens array 103 is disposed in opposition to the imaging sensor 120. A variety of factors, including lens diameter, focal length, distance to the imaging device and a hood for limiting the view angle, are herein designed for each lens element such that an image formed by each lens element is not overlapped with images formed by adjacent lens elements.

The imaging sensor 120 is an imaging device for imaging an object image formed by the optical system 101. The imaging sensor 120 is configured to generate a set of image data for a frame in which an object image is shot.

The AFE (Analog Front End) 121 is configured to perform a variety of processing with respect to the set of image data generated by the imaging sensor 120. Specifically, the AFE 121 is configured to perform a variety of processing such as noise suppression by correlated double sampling, amplification in width of the input range of an A/D converter by an analog gain controller, and A/D conversion by the A/D converter.

The light field information processing unit 125 is configured to generate a piece of light field information and perform a variety of processing with respect to the piece of light field information. When explained in detail, the light field information processing unit 125 is configured to generate a piece of light field information based on a piece of image information of an object image. Further, the light field information processing unit 125 is configured to perform a variety of blurring detection based on the piece of light field information and perform a variety of blurring correction with respect to the piece of light field information. It should be noted that light field information generating portion 110, angle blurring detecting portion 111, angle blurring correcting portion 112, translation blurring detecting portion 113, translation blurring correcting portion 114, rotation blurring detecting portion 116 and rotation blurring correcting portion 117 are mainly implemented in the light field information processing unit 125. The respective portion 110 to 114, 116 and 117 will be described below in detail.

The image processing unit 122 is configured to generate and output a set of image data based on a set of synthesized light field information. Further, the image processing unit 122 is configured to perform a variety of processing, such as smear correction, white balance correction, gamma correction, YC conversion processing and electronic zooming, with respect to the set of image data. Further, the image processing unit 122 is configured to perform a variety of processing such as compression, zooming-out, zooming-in and synthesizing. The image processing unit 122 is configured to generate live view images (also referred to as through images) and recording images by performing the aforementioned processing with respect to the set of image data. In should be noted that output image generating portion 115 is mainly implemented in the image processing unit 122. The output image generating portion 115 will be described below in detail.

In the present exemplary embodiment, the image processing unit 122 is a microcomputer configured to run a variety of programs. However, in another exemplary embodiment, the image processing unit 122 may be a hardwired electronic circuit. Alternatively, the image processing unit 122 may be integrally formed with the controller 130 and so forth.

The controller 130 is configured to comprehensively control actions of the entire digital camera 100. The controller 130 is composed of a ROM, a CPU and so forth. The ROM stores a variety of programs such as a file control program, an AF (Automatic Focus) control program, an AE (Automatic Exposure) control program, a flash light emission control program, and in addition, stores a program for comprehensively controlling the actions of the entire digital camera 100.

For example, the controller 130 is configured to control the light field information processing unit 125. Further, the controller 130 is configured to record the set of image data, for which a variety of processing have been performed by the image processing unit 122, in a memory card 140 and the flash memory 142 (hereinafter referred to as memory and so forth 140 and 142) in the form of still image data or movie data. It should be noted that imaging controlling portion 105 is mainly implemented in the controller 130.

In the present exemplary embodiment, the controller 130 is a microcomputer configured to run a variety of programs. However, in another exemplary embodiment, the controller 130 may be a hardwired electronic circuit. Alternatively, the controller 130 may be integrally formed with the image processing unit 122 and so forth.

The liquid crystal display monitor 123 is configured to display a variety of images such as the live view images and the recording images. The live view images and the recording images are generated by the image processing unit 122. The live view images are a series of images to be consecutively generated at predetermined time intervals by the image processing unit 122 while the digital camera 100 is set in a shooting mode.

The recording images are images to be obtained by decoding either the set of still image data or the set of movie data recorded in the memory and so forth 140 and 142. The recording images are configured to be displayed on the liquid crystal display monitor 123 while the digital camera 100 is set in a play mode.

In another exemplary embodiment, any suitable display capable of displaying an image (an organic EL display, a plasma display, etc.) may be used instead of the liquid crystal display monitor 123.

The buffer memory 124 is a volatile recording medium functioning as a work memory for the image processing unit 122 and the controller 130. In the present exemplary embodiment, the buffer memory 124 is a DRAM.

The flash memory 142 is an internal memory of the digital camera 100. The flash memory 142 is a non-volatile recording medium.

The card slot 141 is a unit into which the memory card 140 is detachably inserted. The card slot 141 is electrically and mechanically connected to the memory card 140. The memory card 140 is an external memory of the digital camera 100. The memory card 140 is a non-volatile recording medium.

The operating unit 150 is an operating interface for receiving an operation from a user. An operating button, an operating dial and so forth, which are disposed on the exterior of the digital camera 100, are herein collectively referred to as the operating unit 150. When receiving an operation from a user, the operating unit 150 is configured to immediately transmit a signal indicating the content of the operation to the controller 130. It should be noted that the operating unit 150 may be an operating interface of a contact input type such as a touch panel. Alternatively, the operating unit 150 may be an external unit that can be remote-controlled.

<1-2. Shooting Action of Light Field Camera>

Figure 3:
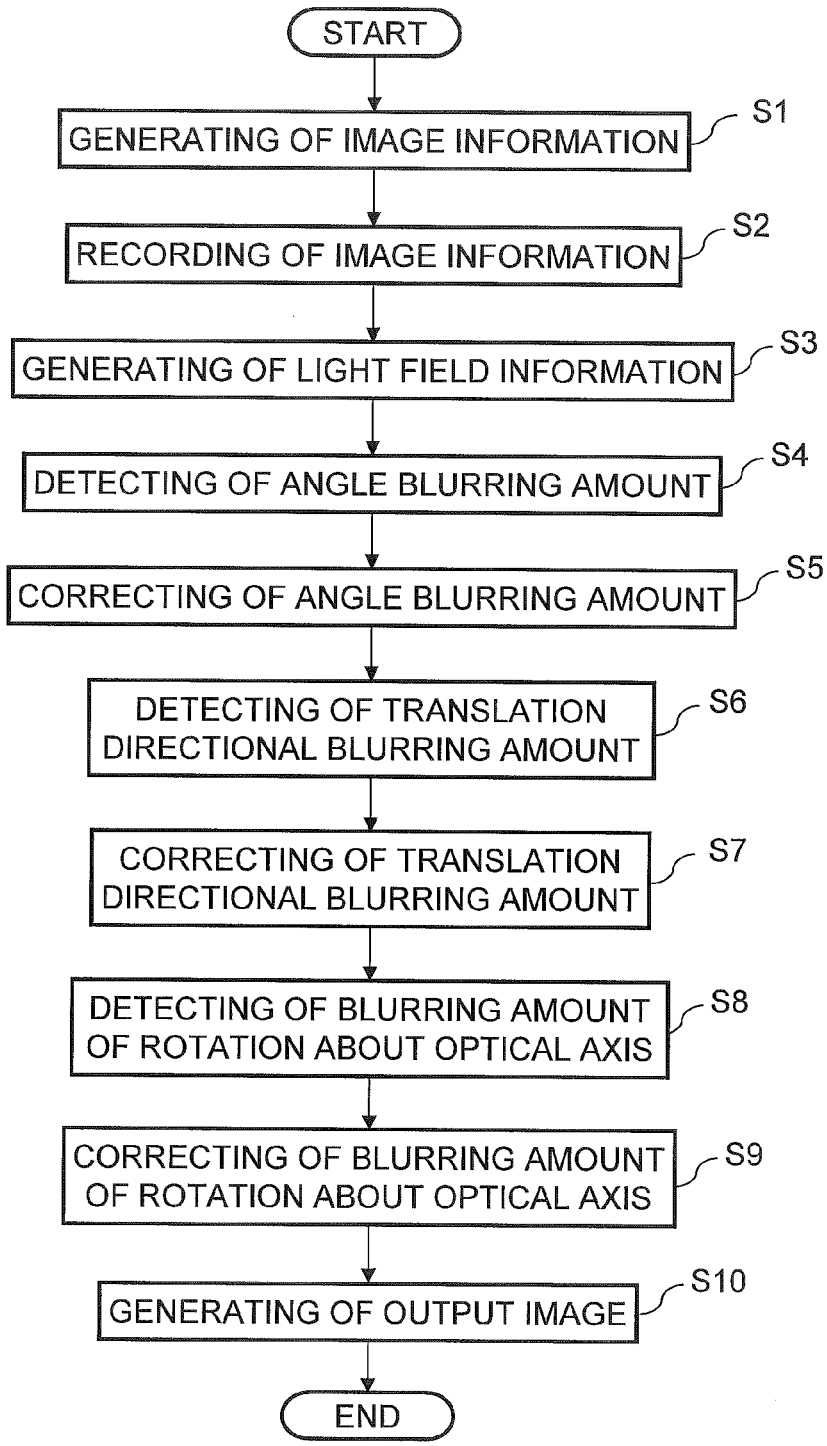
FIG. 3 is a flowchart for showing a configuration of a processing to be performed by the light field camera according to the present exemplary embodiment.

As shown in FIG. 2(A), when an object is shot, light rays that have passed through the lens array 103 reach the imaging sensor 120. Accordingly, an object image, corresponding to the light rays that have passed through the respective lens elements of the lens array 103, is formed on the imaging sensor 120. In response, as shown in FIG. 3, the imaging controlling portion 105 generates a piece of image information of the object image formed on the imaging sensor 120 (Step S1). Specifically, the imaging controlling portion 105 consecutively shoots the object by controlling the imaging sensor 120 and the buffer memory 124. More specifically, the imaging controlling portion 105 sets the exposure time to be short, and repeatedly performs a processing of generating a piece of image information. Thus, the imaging controlling portion 105 generates a plurality of pieces of image information (i.e., a series of image information; time-series information) and records the pieces of generated image information in the buffer memory 124 (Step S2).

It should be noted that the exposure time in generating each of the plural pieces of image information may be set to be constant or variable. Further, the time interval (timing) of generating each of the plural pieces of image information may be set to be seamless, a predetermined time interval, or variable.

Next, based on the series of image information recorded in the buffer memory 124, the light field information generating portion 110 generates a plurality of pieces of light field information I corresponding to the respective pieces of image information. In other words, the light field information generating portion 110 generates a series of light field information corresponding to the series of image information (Step S3).

The light field information is a type of information indicating a light field in a region that the lens array 103 is disposed. Specifically, the light field information is a piece of light intensity information I (x, y, θ, φ). The light intensity information I (x, y, θ, φ) has positional coordinates (x, y) of the respective lens elements and light ray incident angles (θ, φ) in the respective positional coordinates as parameters.

It should be noted that as shown in FIG. 2(A), the surface of the lens array 103 is defined by a coordinate system composed of an x-axis and a y-axis. On the other hand, a z-axis is an axis arranged perpendicularly to the x-y coordinate system, and passes through the centroid of the lens array 103 surface. Further, the z-axis is an axis arranged perpendicularly to the light receiving surface of the imaging sensor 120. In the present exemplary embodiment, the z-axis corresponds to, for instance, the optical axis.

For example, the positional coordinate (x, y) of each lens element is a coordinate indicating the position of the center of each lens element. The light ray incident angle (θ, φ) is an angle formed by the aforementioned z-axis (specifically, a z'-axis of each lens element to be described) and a straight line that connects the center of each lens element and a pixel of an image formed by each lens element.

As shown in FIG. 2(B), the z'-axis is herein defined as an axis that is arranged in parallel to the optical axis and passes through a center Or of each element. In FIG. 2(B), an x'-axis and a y'-axis are defined where the center Or of the lens array 103 surface is set as the origin. A coordinate system composed of the x'-axis, the y'-axis and the z'-axis is a relative coordinate system with respect to the aforementioned coordinate system composed of the x-axis, the y-axis and the z-axis.

Explanation will be herein made for the light ray incident angle (θ, φ) using the relative coordinate system (x', y', z') as described above. As shown in FIG. 2(B), where a vector Lv of a light ray having entered each lens element is projected perpendicularly onto the x'-z' plane, an angle formed by the projected vector and the z'-axis is the light ray incident angle θ. On the other hand, where the vector Lv of the light ray having entered each lens element is projected perpendicularly onto the y'-z' plane, an angle formed by the projected vector and the z'-axis is the light ray incident angle φ.

Next, the angle blurring detecting portion 111 detects an angle blurring amount by comparing the angle directional intensity distributions of the series of light field information I (Step S4). For example, the angle blurring amount is at least either of the blurring amount about the x-axis and the blurring amount about the y-axis. Subsequently, the angle blurring correcting portion 112 corrects the series of light field information I outputted from the light field information generating portion 110 based on the angle blurring amount obtained from the angle blurring detecting portion 111 (Step S5). For example, the angle blurring correcting portion 112 corrects the series of light field information I so as to suppress rotational variation of the series of light field information I.

Next, the translation blurring detecting portion 113 detects the blurring amount in the translation direction by comparing the optical-axis directional intensity distributions (e.g., light intensity information I (x, y, 0, 0)) of the series of light information I (Step S6). For example, the translation directional blurring amount is at least either of the x-axis directional blurring amount and the y-axis directional blurring amount. Subsequently, the translation blurring correcting portion 114 corrects the series of light field information I outputted from the angle blurring correcting portion 112 based on the parallel blurring amount obtained from the translation blurring detecting portion 113 (Step S7). For example, the translation blurring correcting portion 114 corrects the series of light field information I so as to suppress translational variation of the series of light field information I.

Next, the rotation blurring detecting portion 116 detects the rotational blurring amount about the z-axis by comparing the optical-axis directional intensity distributions of the series of light field information I in terms of rotation (Step S8). Then, the rotation blurring correcting portion 117 corrects the series of light field information I outputted from the translation blurring correcting portion 114 based on the rotational blurring amount about the z-axis obtained from the rotation blurring detecting portion 116 (Step S9). For example, the rotation blurring correcting portion 117 corrects the series of light field information I so as to suppress variation of the series of light field information I with respect to the rotation about the z-axis.

Using the series of light field information I outputted from the light field information processing unit 125, the output image generating portion 115 performs an image generating processing based on parameters set for the position of focus, the depth of focus, the view angle and so forth (Step S10). For example, the output image generating portion 115 generates and outputs a still image obtained by synthesizing the series of light field information I and/or a movie obtained by synthesizing a series of images based on the series of light field information I. For example, a processing of adding the series of light field information I is performed in the processing of synthesizing the series of light field information I. With the processing, S/N (signal-to-noise ratio) is enhanced, and a high quality still image can be obtained.

2. Blurring Detection and Blurring Correction

<2-1. Detection and Correction for Angle Blurring in Pitch Direction and Yaw Direction>

Using FIGS. 4(A) and 4(B) and FIGS. 5(A) to 5(D), explanation will be made for a method of detecting and correcting angle blurring in the pitch direction and the yaw direction. It should be noted that as described above, in the present digital camera 100, a series of light field information I are generated from a series of images stored in the buffer memory 124. However, in order to make explanation easy, explanation will be hereinafter made using two of the series of images and two pieces of light field information I corresponding to the two images.

Each of FIGS. 4(A) and 4(B) shows a relation between the optical components of the digital camera 100 and light rays. In each of FIGS. 4(A) and 4(B), objects (e.g., trees) are disposed along a reference axis 201a, 201b. A far distance object 202a, 202b and a near distance object 203a, 203b are herein prepared as objects.

It should be noted that in FIGS. 4(A) and 4(B), reference signs 204a and 204b indicate the z-axis. Further, reference signs 206a and 206b indicate the CCD imaging sensor (120). Yet further, reference signs 205a and 205b indicate the lens array 103 composed of four lens elements.

Figure 4:
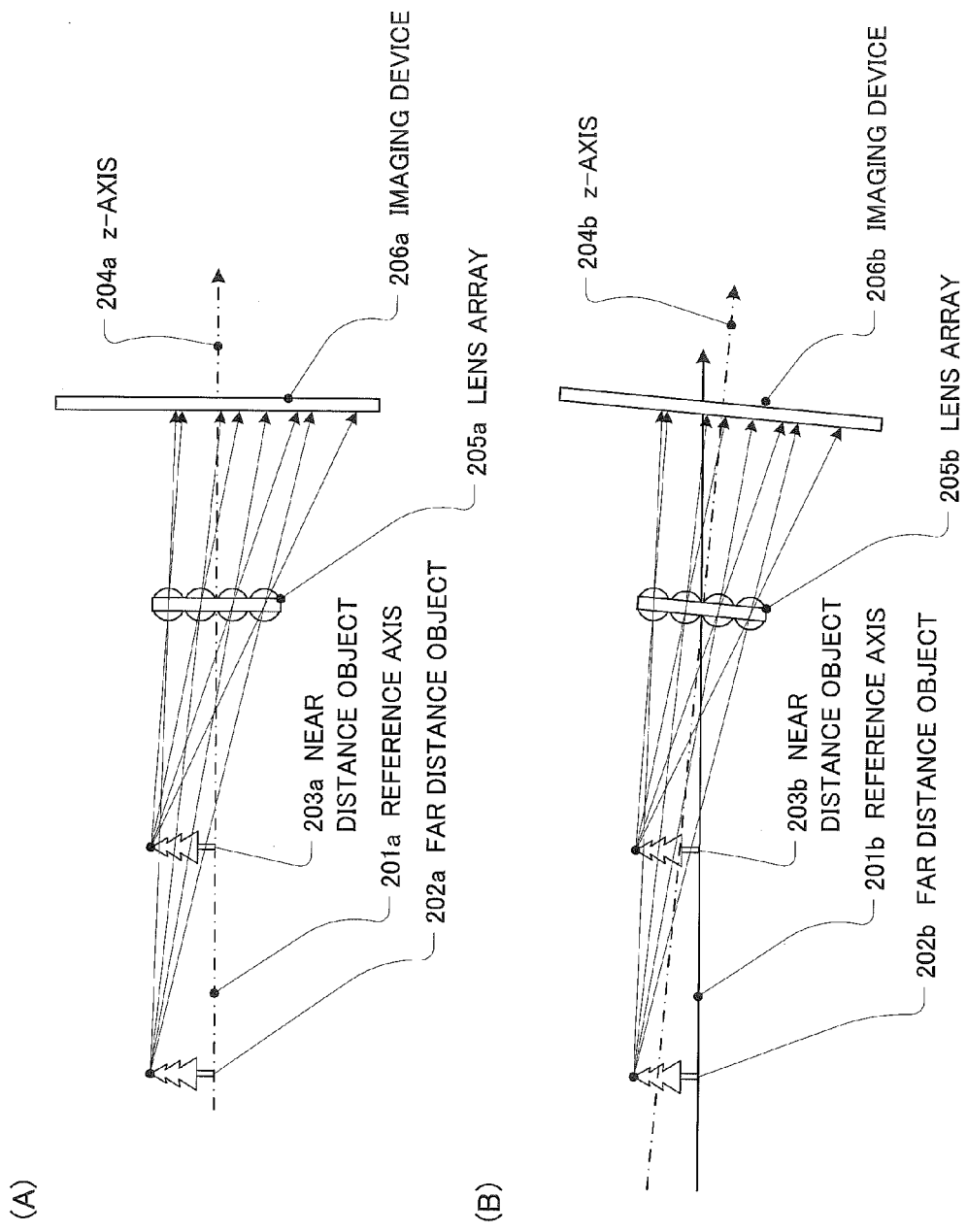
FIG. 4 includes diagrams for showing a relation between light rays and optical components of the light field camera according to the present exemplary embodiment (a diagram (A) represents an initial state, and a diagram (B) represents an angle blurring state)

FIG. 4(A) shows a condition in shooting a first image, whereas FIG. 4(B) shows a condition in shooting a second image. In FIG. 4(A), the z-axis 204a corresponds to the reference axis 201a. In FIG. 4 (B), the z-axis 204b is rotated with respect to the reference axis 201b.

Using arrows, each of FIGS. 4(A) and 4(B) shows a condition that light rays emitted from the apex of the far distance object 202a, 202b and those emitted from the apex of the near distance object 203a, 203b enter the CCD imaging sensor 206a, 206b through the lens array 205a, 205b.

Figure 5:
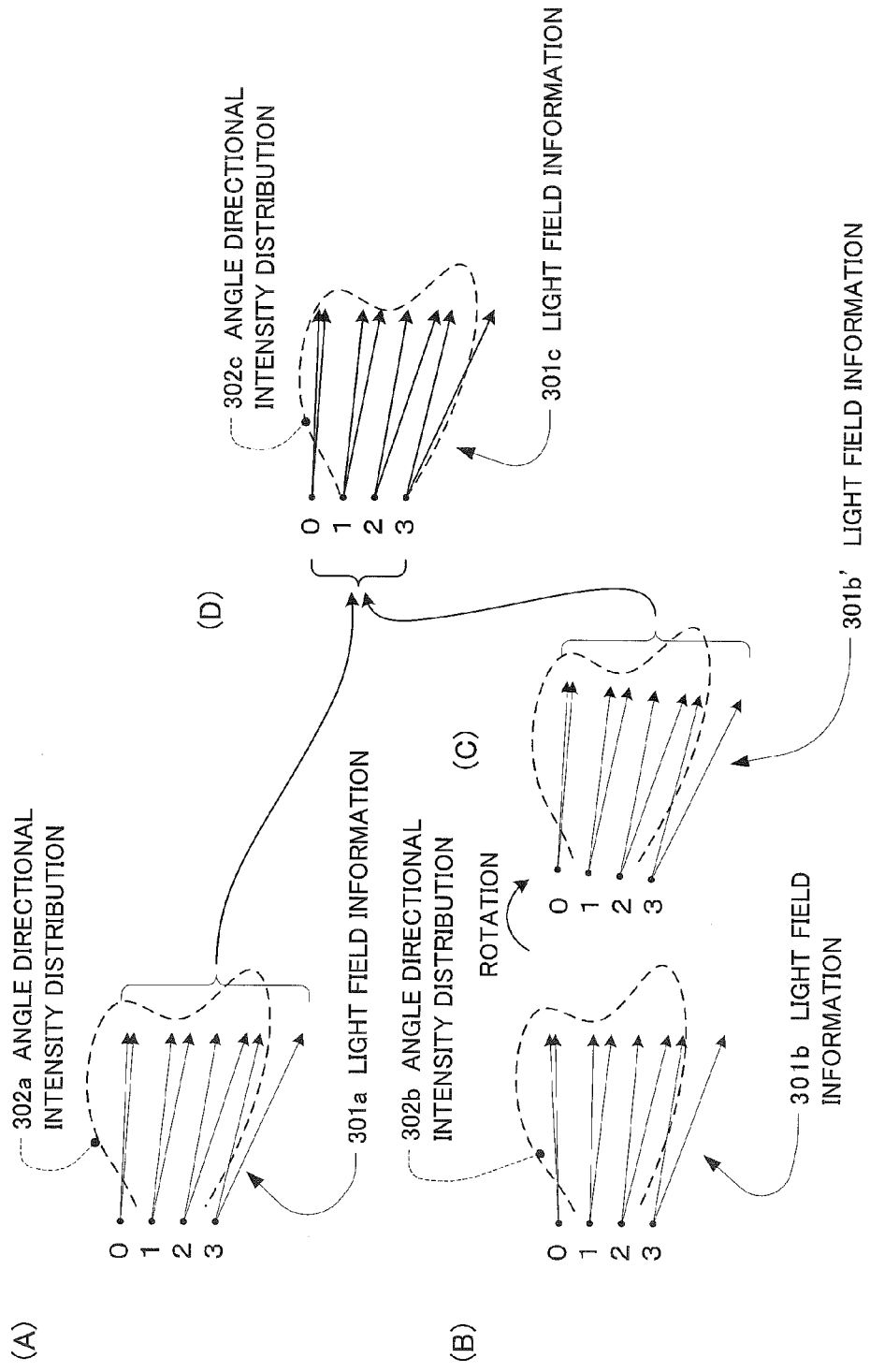
FIG. 5 includes schematic diagrams for explaining states of light field information according to the present exemplary embodiment (a diagram (A) represents an initial state; a diagram (B) represents an angle blurring state; a diagram (C) represents a rotated state; and a diagram (D) represents an angle blurring corrected state)

FIG. 5(A) shows a schematic diagram of a piece of light field information I to be generated in the example of FIG. 4(A). On the other hand, FIG. 5(B) shows a schematic diagram of a piece of light field information I to be generated in the example of FIG. 4(B). Further, FIG. 5(C) shows a schematic diagram of a piece of light field information I obtained as a result of performing a rotation processing, whereas FIG. 5(D) shows a schematic diagram of a piece of light field information I obtained as a result of performing an angle blurring correction processing.

It should be noted that in FIGS. 5(A) and 5(B), reference signs 301a and 301b indicate pieces of light field information I. The piece of light field information 301a, 301b is herein formed based on light rays emitted from the apex of the far distance object 202a, 202b and those emitted from the apex of the near distance object 203a, 203b, i.e., light rays that have passed through the four lens elements 0, 1, 2 and 3 of the lens array 205a, 205b.

In FIGS. 5(A) and 5(B), reference signs 302a and 302b indicate angle directional intensity distributions Iave ($\theta$, $\phi$). The angle directional intensity distribution Iave ($\theta$, $\phi$) is obtained by averaging the piece of light field information I formed based on light rays emitted from all the objects located within the view angle in all the positions in the (x, y) direction. The angle directional intensity distribution Iave ($\theta$, $\phi$) is an indicator for indicating correspondence between incident angles and intensities of light rays in the entire region of the lens array 205a, 205b. It should be noted that even when translation blurring is included in the piece of light field information I, its influence can be reduced by thus averaging the piece of light field information I in the (x, y) direction.

The angle blurring detecting portion 111 includes angle directional intensity distribution extracting portion 111a and horizontal-and-vertical directional rotation blurring detecting portion 111b. The angle directional intensity distribution extracting portion 111a is configured to calculate the angle directional intensity distribution 302a, 302b by averaging the piece of light field information I in the (x, y) direction. Then, the horizontal-and-vertical directional rotation blurring detecting portion 111b is configured to perform pattern matching of the angle directional intensity distribution 302b with respect to the angle directional intensity distribution 302a, while modifying the angle coordinate of the angle directional intensity distribution 302b. Then, the angle blurring detecting portion 111 is configured to obtain an angle coordinate modified amount by which the angle directional intensity distribution 302b has the least error with respect to the angle directional intensity distribution 302a. Thus, the angle blurring detecting portion 111 is configured to detect the angle blurring amount of the light field information 301b with respect to the light field information 301a.

The angle blurring correcting portion 112 (an example of horizontal-and-vertical directional rotation blurring correcting portion) is configured to correct the angle coordinate of the light field information 301b using the angle blurring amount obtained by the angle blurring detecting portion 111. Accordingly, a condition is implemented that the light rays, on which the light field information 301b is based, are rotated in accordance with the angle blurring amount. Thus, the angle blurring correcting portion 112 is configured to generate a piece of light field information 301b' obtained by reducing the error of the light field information 301b with respect to the light field information 301a. Then, the angle blurring correcting portion 112 is further configured to output a piece of light field information 301c by averaging the light field information 301b' and the light field information 301a.

It should be noted that the aforementioned angle blurring detecting portion 111 may be configured to use a result of integrating a value of angular velocity detected by a gyroscope instead of performing the signal processing of the pieces of light field information I. In this case, the pattern matching can be eliminated.

<2-2. Blurring Correction for Translation>

Figure 6:
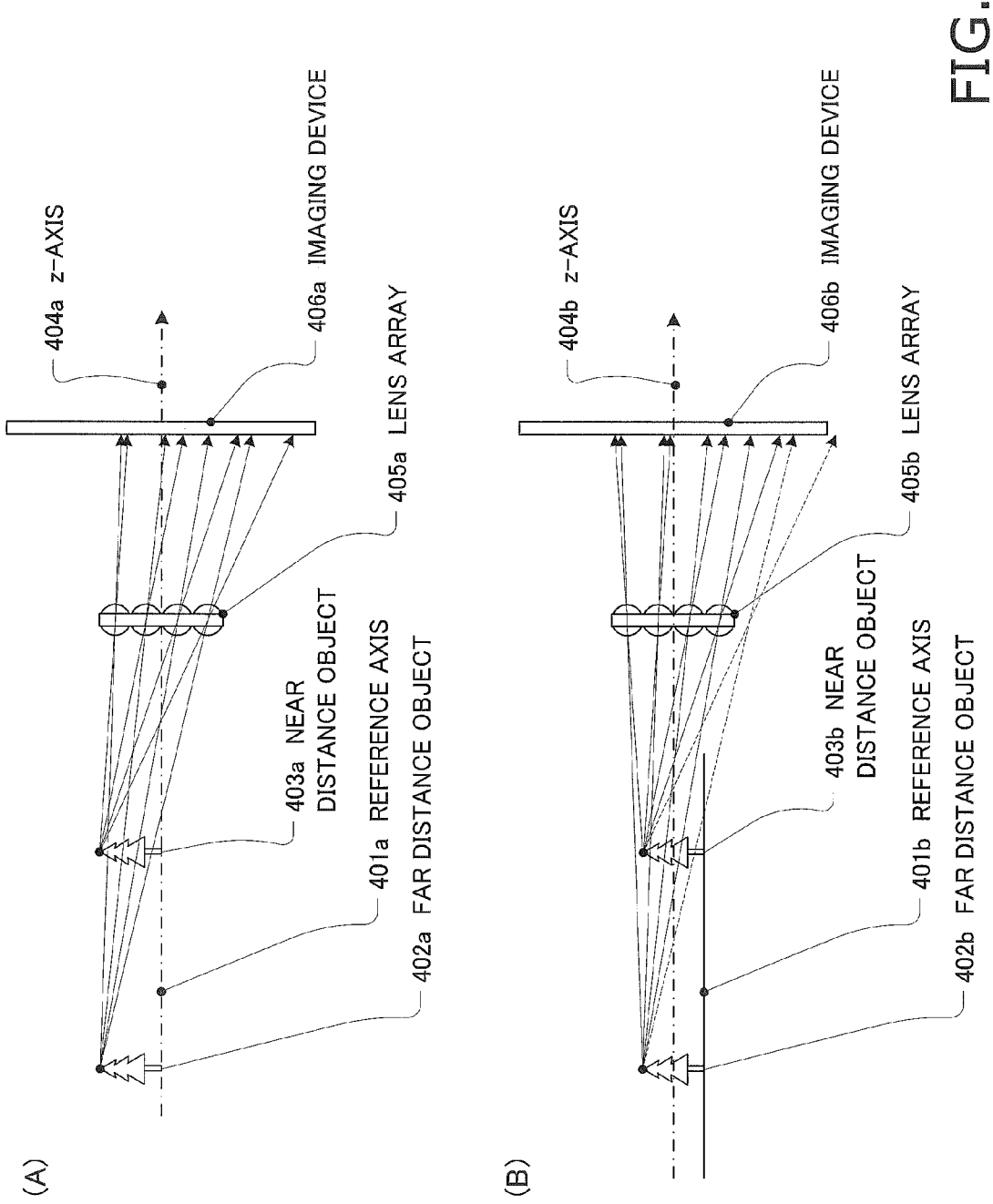
FIG. 6 includes diagrams for showing a relation between light rays and the optical components of the light field camera according to the present exemplary embodiment (a diagram (A) represents an initial state and a diagram (B) represents a translation blurring state)

Next, using FIGS. 6(A) and 6(B) and FIGS. 7(A) to 7(C), explanation will be made for a method of correcting translation blurring. In FIG. 6(A), reference signs 401a to 406a indicate the same elements as those indicated by the reference signs 201*a* to 206*a* in FIG. 4(A). In FIG. 6(B), reference signs 401*b* to 406*b* indicate the same elements as those indicated by the reference signs 201*b* to 206*b* in FIG. 4(B).

Similarly to FIGS. 4(A) and 4(B), FIG. 6(A) shows a condition in shooting a first image, whereas FIG. 6(B) shows a condition in shooting a second image. In FIG. 6(A), the reference axis 401*a* corresponds to the z-axis 404*a*. In FIG. 6(B), the z-axis 404*b* is upwardly translated with respect to the reference axis 401*b*.

Figure 7:
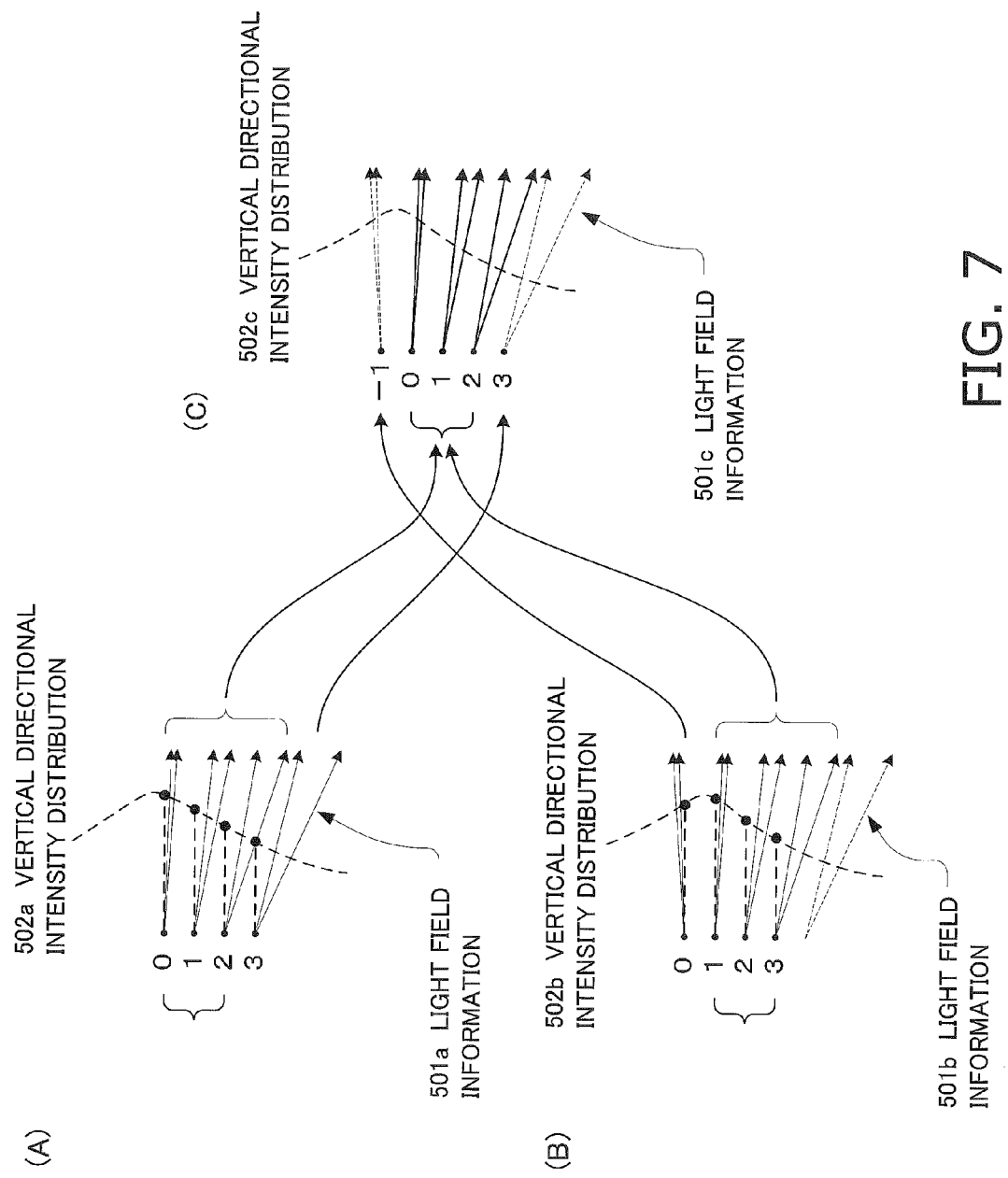
FIG. 7 includes schematic diagrams for explaining states of light field information according to the present exemplary embodiment (a diagram (A) represents an initial state; a diagram (B) represents a translation blurring state; and a diagram (C) represents a translation blurring corrected state)

Each of FIGS. 7(A) and 7(B) shows a schematic diagram of a piece of light field information I to be generated by the light field information generating portion 110 in each of the examples of FIGS. 6(A) and 6(B). Further, FIG. 7(C) shows a schematic diagram of a piece of light field information I obtained as a result of performing translation blurring correction.

In FIGS. 7(A) and 7(B), reference signs 501*a* and 501*b* indicate pieces of light field information I. The piece of light field information 501*a*, 501*b* is herein formed based on light rays emitted from the apex of the far distance object 402*a*, 402*b* and those emitted from the near distance object 403*a*, 403*b*, i.e., light rays that have passed through the four lens elements 0, 1, 2 and 3 of the lens array 405*a*, 405*b*.

In FIGS. 7(A) and 7(B), reference signs 502*a* and 502*b* indicate optical-axis directional intensity distributions I (x, y, 0, 0). The optical-axis directional intensity distribution I (x, y, 0, 0) is obtained by extracting the optical-axis directional intensities of incident light rays in the respective positions from the piece of light field information I formed based on light rays emitted from all the objects located within the view angle.

The translation blurring detecting portion 113 includes plane directional intensity distribution extracting portion 113*a* and parallel blurring detecting portion 113*b*. The plane directional intensity distribution extracting portion 113*a* is configured to extract the optical-axis directional intensities of incident light rays in the respective positions from the piece of light field information 501*a*, 501*b* and calculate an optical-axis directional intensity distribution 502*a*, 502*b*. The parallel blurring detecting portion 113*b* is configured to perform pattern matching of the optical-axis directional intensity distribution 502*b* with respect to the optical-axis directional intensity distribution 502*a*, while modifying the positional coordinate of the optical-axis directional intensity distribution 502*b*. Then, the translation blurring detecting portion 113 is configured to obtain a positional coordinate modified amount by which the optical-axis directional intensity distribution 502*b* has the least error with respect to the optical-axis directional intensity distribution 502*a*. Thus, the translation blurring detecting portion 113 is configured to detect the parallel blurring amount of the light field information 501*b* with respect to the light field information 501*a* (an example of parallel blurring detecting portion).

The translation blurring correcting portion 114 (an example of parallel blurring correcting portion) is configured to correct the positional coordinate of the light field information 501*b* using the parallel blurring amount obtained by the translation blurring detecting portion 113. Accordingly, a condition is implemented that the light rays, on which the light field information 501*b* is based, are translated in accordance with the parallel blurring amount. Thus, the translation blurring correcting portion 114 is configured to correct the light field information 501*b* so as to eliminate the error of the light field information 501*b* with respect to the light field information 501*a*. Then, the translation blurring correcting portion 114 is configured to output a piece of light field information 501*c* by averaging the light field information 501*a* and the corrected light field information 501*b*.

The light field information 501*c* shown in FIG. 7(C) includes light rays that have passed through the lens elements 0, 1 and 2 as light rays commonly included in both of the light field information 501*a* and the light field information 501*b*. Therefore, S/N can be enhanced by averaging the common light rays. On the other hand, the light rays having passed through the lens element 3 in the light field information 501*a* of FIG. 7(A) and those having passed through the lens element 0 in the light field information 501*b* of FIG. 7(B) are not commonly included in both of the light field information 501*a* and the light field information 501*b*. However, when the uncommon light rays are included in the piece of light field information I to be outputted, a greater parallax can be utilized with use of a wider range of light field information I. Contrarily, when the uncommon light rays are not included in the piece of light field information I to be outputted, enhancement in S/N can be implemented by generating the output light field information I through averaging of only the common light rays of the plural pieces of light field information I.

<2-3. Blurring Correction for Rotation>

Figure 8:
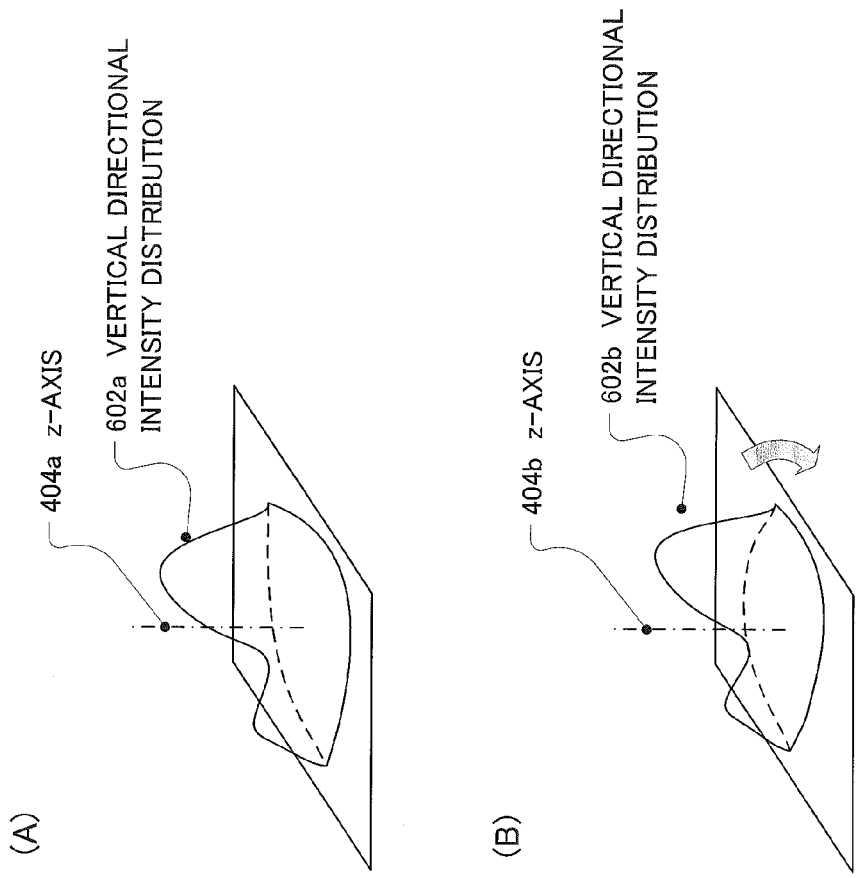
FIG. 8 includes diagrams for showing a three-dimensional optical axis directional intensity distribution according to the present exemplary embodiment (a diagram (A) represents an initial state and a diagram (B) represents a rotation blurring state).

Next, using FIGS. 8(A) and 8(B), explanation will be made for a method of correcting rotational blurring about the z-axis. FIGS. 8(A) and 8(B) are three-dimensional perspective views of the optical-axis directional intensity distributions explained with reference to FIGS. 7(A) and 7(B). Reference signs 602*a* and 602*b* indicate the optical-axis directional intensity distributions of the pieces of light field information I.

For example, when a second image corresponding to FIG. 8(B) is shot while being rotated about the z-axis 404*b* with respect to a first image corresponding to FIG. 8(A), the optical-axis directional intensity distribution 602*b* is obtained as a distribution rotated about the optical axis with respect to the optical-axis directional intensity distribution 602*a*. Therefore, the rotation blurring detecting portion 116 (an example of rotation-about-axis blurring detecting portion) is configured to detect the blurring amount in rotation about the z-axis by performing pattern matching between the optical-axis directional intensity distribution 602*a* and the optical-axis directional intensity distribution 602*b* while changing the rotation angle. Then, the rotation blurring correcting portion 117 (an example of rotation-about-axis blurring correcting portion) is configured to correct blurring in rotation about the z-axis by adding a processing of rotating the positional coordinate to the processing performed by the translation blurring detecting portion 113 and that performed by the translation blurring correcting portion 114.

3. Summary

An image blurring correction device includes the light field information generating portion 110, the blurring amount detecting portion 111, 113, 116 and the correcting portion 112, 114, 117. The light field information generating portion 110 is configured to generate a series of light field information I corresponding to consecutive shooting images shot by the digital camera 100. The blurring amount detecting portion 111, 113, 116 is configured to detect the blurring amount of the digital camera 100 based on variation in the series of light field information I. The correcting portion 112, 114, 117 is configured to correct the series of light field information I in accordance with the blurring amount so as to suppress variation in the series of light field information I.

The digital camera 100, equipped with the image blurring correction device herein described, is configured to detect the blurring amount thereof based on variation in the series of light field information I and correct the series of light field information I in accordance with the blurring amount so as to suppress variation in the series of light field information I. With use of the pieces of light field information I, image blurring can be successfully corrected even when a plurality of objects exist in different positions in the depth direction.

Other Embodiments (1) The method of obtaining series of light field information I is not limited to the aforementioned method with use of the lens array 103. Alternatively, series of light field information I can be obtained with coded aperture imaging.

(2) In the aforementioned exemplary embodiment, explanation has been made for the present technology on the premise of shooting still images. However, the present technology may be applied to shooting of a movie.

(3) In the aforementioned exemplary embodiment, explanation has been made for the example of performing blurring correction for angle blurring, that for parallel blurring and that for rotation blurring in this order. However, the order of blurring corrections is not limited to the above, and may be arbitrarily changed.

(4) In the aforementioned exemplary embodiment, explanation has been made for the example of performing various blurring detections using series of light field information I for which correction has not been performed. However, the various blurring detections may be performed using series of light field information I for which correction has been performed.

(5) In the aforementioned exemplary embodiment, explanation has been made for the example of performing blurring correction for angle blurring, that for parallel blurring and that for rotation blurring. However, at least any one of the blurring corrections of three types may be configured to be performed.

(6) In the aforementioned exemplary embodiment, explanation has been made for the example of independently performing detection and correction for parallel blurring and those for rotation blurring. However, as described above, rotation blurring about the z-axis can be corrected by adding the processing of rotating the positional coordinate to the processing performed by the translation blurring detecting portion 113 and that performed by the translation blurring correcting portion 114. Therefore, detection and correction for parallel blurring and those for rotation blurring may be configured to be simultaneously performed.

(7) Following is the summary of a plurality of aspects that can be implemented in the digital camera 100. The aspects can be arbitrarily combined on an as-needed basis.

In the following explanation, the imaging device corresponds to the digital camera 100. The blurring amount detecting portion includes at least any one of the angle blurring detecting portion 111, the translation blurring detecting portion 113 and the rotation blurring detecting portion 116. The angle directional intensity distribution extracting portion includes the angle blurring detecting portion 111. The horizontal-and-vertical directional rotation blurring detecting portion includes at least either of the translation blurring detecting portion 113 and the rotation blurring detecting portion 116.

The correcting portion includes at least any one of the angle blurring correcting portion 112, the translation blurring correcting portion 114 and the rotation blurring correcting portion 117. The horizontal-and-vertical directional rotation blurring correcting portion includes the angle blurring correcting portion 112. The parallel blurring and rotation-about-axis blurring correcting portion includes at least either of the translation blurring correcting portion 114 and the rotation blurring correcting portion 117.

(A) As described above, the image blurring correction device is configured to correct image blurring based on light rays that have passed through the lens array disposed in alignment on the plane intersecting with the optical axis. The image blurring correction device includes the light field information generating portion, the blurring amount detecting portion and the correcting portion. The light field information generating portion is configured to generate a series of light field information corresponding to consecutive shooting images shot by the imaging device. The blurring amount detecting portion is configured to detect the blurring amount of the imaging device based on variation in the series of light field information. The correcting portion is configured to correct the series of light field information in accordance with the blurring amount so as to suppress variation in the series of light field information.

(B-1) In the image blurring correction device, the blurring amount detecting portion includes the angle directional intensity distribution extracting portion and the horizontal-and-vertical directional rotation blurring detecting portion. The angle directional intensity distribution extracting portion is configured to extract pieces of angle directional intensity distribution information from the series of light field information. The horizontal-and-vertical directional rotation blurring detecting portion is configured to detect rotation blurring amounts of the imaging device in horizontal and vertical directions by performing pattern matching using the pieces of angle directional intensity distribution information. The correcting portion includes the horizontal-and-vertical directional rotation blurring correcting portion. The horizontal-and-vertical directional rotation blurring correcting portion is configured to correct the series of light field information in accordance with the rotation blurring amounts so as to suppress variation in the angle directional intensity distributions in the series of light field information. Further, the horizontal-and-vertical directional rotation blurring correcting portion is configured to output the series of corrected light field information as series of first corrected light field information.

(B-2) In the image blurring correction device, the blurring amount detecting portion is further configured to detect at least either of the parallel blurring amounts of the imaging device in the horizontal and vertical directions and the rotation-about-axis blurring amount of the imaging device based on series of plane directional intensity distribution information to be extracted from the series of first corrected light field information. The correcting portion is further configured to correct the series of first corrected light field information based on the aforementioned at least either of the blurring amounts so as to suppress variation in plane directional intensity distributions in the series of first corrected light field information. Further, the correcting portion is configured to output the series of post-correction first corrected light field information as series of second corrected light field information.

(C-1) In the image blurring correction device, the blurring amount detecting portion includes the plane directional intensity distribution extracting portion and the parallel blurring and rotation-about-axis blurring detecting portion. The plane directional intensity distribution extracting portion is configured to extract pieces of plane directional intensity distribution information from the series of light field information. The parallel blurring and rotation-about-axis blurring detecting portion is configured to detect at least either of the parallel blurring amounts of the imaging device in the horizontal and vertical directions and the rotation-about-axis blurring amount of the imaging device by performing pattern matching using the pieces of plane directional intensity distribution information. The correcting portion includes the parallel blurring and rotation-about-axis blurring correcting portion. The parallel blurring and rotation-about-axis blurring correcting portion is configured to correct the series of light field information in accordance with the aforementioned at least either of the blurring amounts so as to suppress variation in the plane directional intensity distributions in the series of light field information. Further, the parallel blurring and rotation-about-axis blurring correcting portion is configured to output the series of corrected light field information as series of first corrected light field information.

(C-2) In the image blurring correction device, the blurring amount detecting portion is further configured to detect the rotation blurring amounts of the imaging device in the horizontal and vertical directions based on pieces of angle directional intensity distribution information to be extracted from the series of first corrected light field information. The correcting portion is further configured to correct the series of first corrected light field information in accordance with the rotation blurring amounts so as to suppress variation in the angle directional intensity distributions in the series of first corrected light field information. Further, the correcting portion is configured to output the series of post-correction first corrected light field information as series of second corrected light field information.

(D) In the image blurring correction device, the blurring amount detecting portion may detect the blurring amount of the imaging device based on variation in the series of light field information and the rotation angular velocity to be generated in the imaging device. The rotation angular velocity to be generated in the imaging device may be herein detected by, for instance, a gyroscope.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the image blurring correction device. Accordingly, these terms, as utilized to describe the present technology should be interpreted relative to the image blurring correction device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The technology herein disclosed is widely applicable to image blurring correction devices.

What is claimed is:

1. An image blurring correction device, comprising:
light field information generating portion configured to generate a series of light field information corresponding to multiple consecutive images captured by an imaging device, wherein the multiple consecutive images are captured at different points in time;
blurring amount detecting portion configured to detect a blurring amount of the imaging device based on variation in the series of light field information, wherein the blurring amount corresponds to movement of the imaging device between the different point in time when the multiple consecutive images are captured; and
correcting portion configured to correct the series of light field information in accordance with the blurring amount so as to suppress variation in the series of light field information.

2. The image blurring correction device according to claim 1, wherein
the blurring amount detecting portion includes:
angle directional intensity distribution extracting portion configured to extract pieces of angle directional intensity distribution information from the series of light field information; and
horizontal-and-vertical directional rotation blurring detecting portion configured to detect rotation blurring amounts of the imaging device in horizontal and vertical directions by performing pattern matching using the pieces of angle directional intensity distribution information, and
the correcting portion includes:
horizontal-and-vertical directional rotation blurring correcting portion configured to correct the series of light field information in accordance with the rotation blurring amounts so as to suppress variation of the angle directional intensity distributions in the series of light field information.

3. The image blurring correction device according to claim 1, wherein
the blurring amount detecting portion includes:
plane directional intensity distribution extracting portion configured to extract pieces of plane directional intensity distribution information from the series of light field information; and
parallel blurring and rotation-about-axis blurring detecting portion configured to detect at least either of parallel blurring amounts of the imaging device in horizontal and vertical directions and a rotational blurring amount of the imaging device about a predetermined axis by performing pattern matching using the pieces of plane directional intensity distribution information, and the correcting portion includes:
parallel blurring and rotation-about-axis blurring correcting portion configured to correct the series of light field information in accordance with the at least either of the blurring amounts so as to suppress variation of the plane directional intensity distributions in the series of light field information.

4. The image blurring correction device according to claim 2, wherein
the blurring amount detecting portion includes:
plane directional intensity distribution extracting portion configured to extract pieces of plane directional intensity distribution information from the series of light field information; and
parallel blurring and rotation-about-axis blurring detecting portion configured to detect at least either of parallel blurring amounts of the imaging device in horizontal and vertical directions and a rotational blurring amount of the imaging device about a predetermined axis by performing pattern matching using the pieces of plane directional intensity distribution information, and the correcting portion includes:
parallel blurring and rotation-about-axis blurring correcting portion configured to correct the series of light field information in accordance with the at least either of the blurring amounts so as to suppress variation of the plane directional intensity distributions in the series of light field information.

* * * * *